United States Patent
Bornhoevd et al.

(10) Patent No.: US 7,817,039 B2
(45) Date of Patent: Oct. 19, 2010

(54) DYNAMIC DISPLAY OF RFID AND SENSOR DATA

(75) Inventors: Christof Bornhoevd, San Francisco, CA (US); Rama Gurram, San Jose, CA (US); Brian S. Mo, Palo Alto, CA (US)

(73) Assignee: SAP Aktiengesellschaft, Walldorf (DE)

( * ) Notice: Subject to any disclaimer, the term of this patent is extended or adjusted under 35 U.S.C. 154(b) by 696 days.

(21) Appl. No.: 11/767,355

(22) Filed: Jun. 22, 2007

(65) Prior Publication Data

US 2007/0296588 A1    Dec. 27, 2007

Related U.S. Application Data

(63) Continuation of application No. 11/020,384, filed on Dec. 22, 2004, now Pat. No. 7,250,862.

(51) Int. Cl.
*G08B 13/14* (2006.01)

(52) U.S. Cl. ............... 340/572.1; 340/999; 340/870.01; 705/22; 705/28

(58) Field of Classification Search ............... 340/572.1, 340/521, 539.1, 539.11, 870.01, 999; 705/22, 705/28
See application file for complete search history.

(56) References Cited

U.S. PATENT DOCUMENTS 5,576,952 A * 11/1996 Stutman et al. .......... 340/539.1
6,437,692 B1    8/2002 Petite et al.

(Continued)

OTHER PUBLICATIONS

J. Van Den Broecke, "Pushlets-Whitepaper," http://www.pushlets.com/doc/whitepaper-all.html, (16 pages) Aug. 6, 2002.

*Primary Examiner*—Eric M Blount
(74) *Attorney, Agent, or Firm*—Fish & Richardson P.C.

(57) ABSTRACT

Systems, methods and computer program products, implementing techniques for automatic data acquisition and the real-time display of automatically acquired data. A system implementing the techniques includes one or more automatic data acquisition devices that emit data; and a data integration system that receives data from the automatic data acquisition devices and processes the data. The data integration system includes a display system for displaying the data to a user. The display system is operable to generate a graphical display and to update the graphical display automatically and only when new data from the automatic data acquisition devices is available. The display system is operable to update only affected parts of the graphical display but not necessarily the entire display.

26 Claims, 8 Drawing Sheets

U.S. PATENT DOCUMENTS

| | | | |
|---|---|---|---|
| 6,462,656 B2 * | 10/2002 | Ulrich et al. | 340/539.1 |
| 6,671,698 B2 | 12/2003 | Pickett et al. | |
| 6,757,710 B2 * | 6/2004 | Reed | 709/203 |
| 6,825,763 B2 * | 11/2004 | Ulrich et al. | 340/539.1 |
| 6,943,681 B2 * | 9/2005 | Rezvani et al. | 340/506 |
| 7,103,511 B2 | 9/2006 | Petite | |
| 7,512,401 B2 * | 3/2009 | Muhonen et al. | 455/414.1 |
| 7,539,532 B2 * | 5/2009 | Tran | 600/509 |
| 2002/0111819 A1 * | 8/2002 | Li et al. | 705/1 |
| 2003/0046339 A1 | 3/2003 | Ip | |
| 2003/0177175 A1 | 9/2003 | Worley et al. | |
| 2003/0227392 A1 | 12/2003 | Ebert et al. | |
| 2004/0024768 A1 | 2/2004 | Haller | |
| 2004/0075549 A1 * | 4/2004 | Haller | 340/522 |
| 2004/0196182 A1 | 10/2004 | Unnold | |
| 2005/0050164 A1 | 3/2005 | Burd et al. | |
| 2005/0151641 A1 * | 7/2005 | Ulrich et al. | 340/539.13 |
| 2005/0218221 A1 | 10/2005 | Nark et al. | |
| 2007/0112574 A1 * | 5/2007 | Greene | 705/1 |
| 2009/0146832 A1 * | 6/2009 | Ebert et al. | 340/825.49 |
| 2009/0247146 A1 * | 10/2009 | Wesby | 455/419 |

* cited by examiner

DYNAMIC DISPLAY OF RFID AND SENSOR DATA

CROSS-REFERENCE TO RELATED APPLICATION

This application is a continuation of prior U.S. patent application Ser. No. 11/020,384, filed on Dec. 22, 2004, which is incorporated herein by reference.

BACKGROUND

The present disclosure relates to data processing by digital computer, and more particularly to automatic data acquisition and the display of automatically acquired RFID (Radio Frequency Identification) data and sensor data.

Systems exist for integrating data acquisition devices such as RFID tag readers and sensor devices with enterprise software applications that make use of the data acquired by the data acquisition devices. In this specification, such systems will be referred to as data integration systems.

Data integration systems typically provide an application programming interface through which the enterprise applications can access the data collected by the data integration system. However, conventional data integration systems typically do not provide a user interface through which a human user can view the automatically acquired RFID and sensor data.

SUMMARY OF THE INVENTION

Systems, methods and computer program products, implementing techniques for displaying automatically acquired data.

In one general aspect, the techniques include receiving data emitted by a plurality of automatic data acquisition devices, displaying the data for viewing by a user, and automatically updating the displayed data only when new data is received. The automatic data acquisition devices include both periodic devices that emit periodic data and aperiodic devices that emit aperiodic data. Periodic data is data that is emitted continuously at regular intervals. Aperiodic data is data that is emitted at irregular intervals.

Implementations may include one or more of the following features.

The data may be received by a server. Displaying the data for viewing by a user may include sending the data to a client and displaying the data on the client for viewing by a user.

The server may be a web server and the client may be a web browser.

The periodic devices may include sensor devices and the aperiodic devices may include RFID (Radio Frequency Identification) tag readers.

In another general aspect, the techniques include subscribing to a publication service that publishes data emitted by automatic data acquisition devices, the publication service being provided by a web server, receiving a web page from the web server, the web page including the data, displaying the web page for viewing by a user, receiving from the web server one or more updates to the data, identifying a portion of the web page that is affected by the updates; and redrawing only the identified portion of the web page, the identified portion being less than the entire web page. The automatic data acquisition devices include both periodic devices that emit periodic data and aperiodic devices that emit aperiodic data. Periodic data is data that is emitted continuously at regular intervals, aperiodic data is data that is emitted at irregular intervals.

Implementations may include one or more of the following features.

The web page may be displayed in a web browser without the installation of any additional programs or components to the web browser.

The web page may further include a mechanism that is operable to establish a persistent connection with the web server. The web page including the data, and the one or more updates to the data, may be received through the persistent connection.

The periodic devices may include sensor devices and the aperiodic devices may include RFID (Radio Frequency Identification) tag readers.

In another general aspect, a system implementing the techniques described herein includes one or more automatic data acquisition devices that emit data and a data integration system that receives data from the automatic data acquisition devices and processes the data. The data integration system includes a display system for displaying the data to a user in real time.

Implementations may include one or more of the following features.

The data integration system may be operable to send the data to display system and to separately send the data to one or more enterprise applications.

The display system may be operable to generate a graphical display and to update the graphical display automatically.

The display system may be operable to update the graphical display only when new data from the automatic data acquisition devices is available.

The display system may be operable to update the graphical display without redrawing the entire graphical display.

The display system may include a web server and a web browser and the graphical display may be a web page.

The web page may be displayed by the web browser without the installation of any additional programs or components.

The automatic data acquisition devices may include both periodic devices that emit periodic data and aperiodic devices that emit aperiodic data, periodic data being data that is emitted continuously at regular intervals, aperiodic data being data that is emitted at irregular intervals.

The periodic devices may include sensor devices and the aperiodic devices include RFID (Radio Frequency Identification) tag readers.

The data integration system may include a rules engine that executes a set of rules, each rule specifying one or more conditions and one or more activities to be executed when the conditions are met.

The activities may include sending an event to the display system, the event containing data emitted by the automatic data acquisition devices.

The display system may be operable to generate multiple graphical displays and to update the multiple graphical displays simultaneously.

The techniques can be implemented to realize one or more of the following advantages.

Data collected by data acquisition devices can be viewed in real time by a human user. Workers in a supply chain, for example, dock hands, truck drivers, and store or warehouse clerks, can view accurate real-time information about the status and disposition of physical goods in the supply chain.

The data can be viewed through a graphical display. The graphical display can be viewed from a portable hand-held device or from a desktop computer.

The graphical display can be viewed in a basic, off-the-shelf web browser without requiring the installation of any additional components or programs to the web browser.

The graphical display can update automatically without user intervention. This allows for hands-free use of the display.

The data can be viewed simultaneously in multiple graphical displays. The multiple graphical displays can be updated simultaneously. Graphical displays that subscribe to the same topics will receive the same updates and at the same time.

The update can be configured to only occur when new data is available, thereby reducing the burden on system performance.

The update can be performed without having to redraw the entire display, thereby increasing system efficiency.

The display system can be combined with a data integration system to provide an end-to-end solution for the automatic acquisition of RFID and sensor data and the display of such data to an end user.

One implementation provides all of the above advantages.

Details of one or more implementations are set forth in the accompanying drawings and in the description below. Further features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
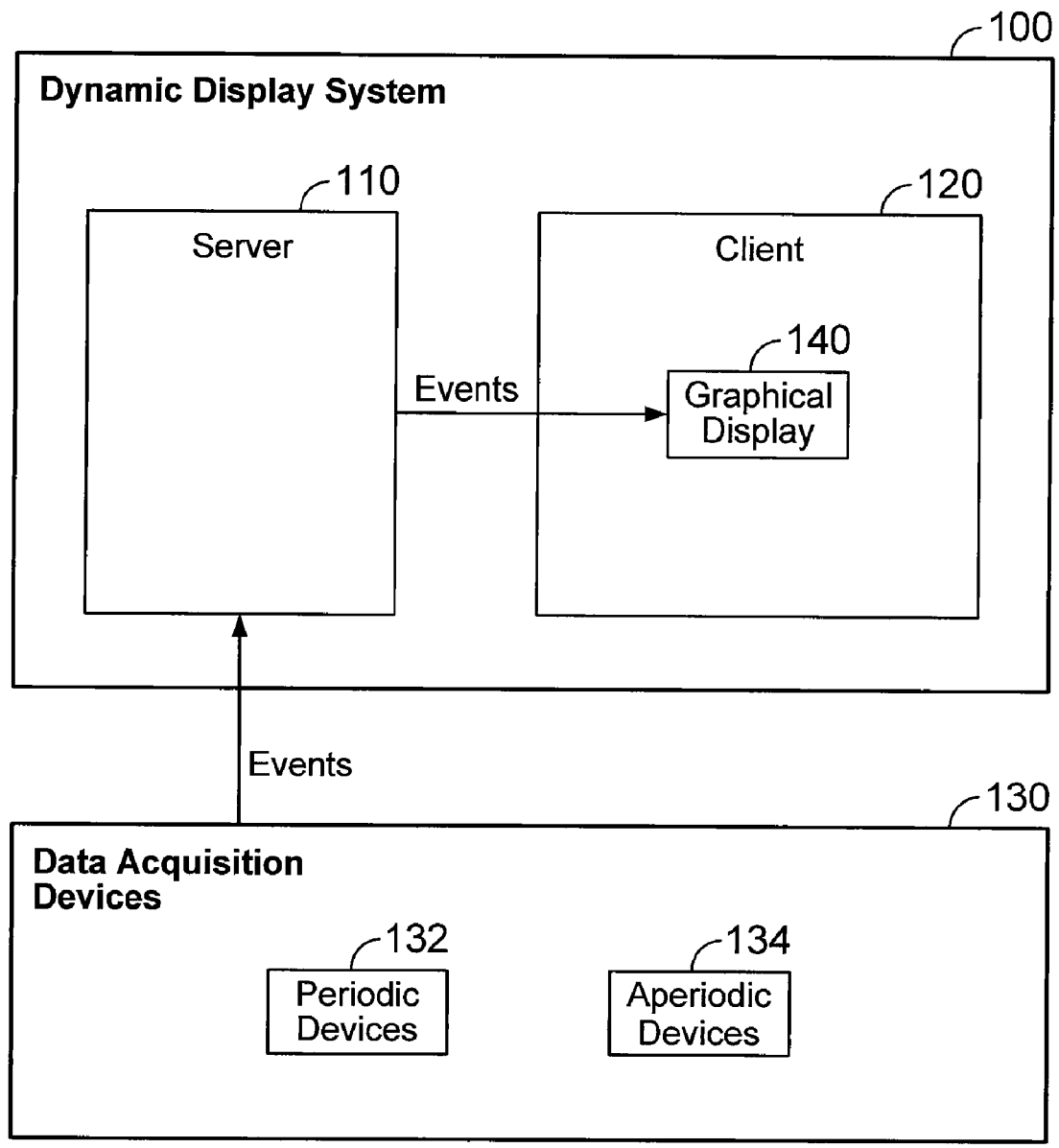
FIG. 1 illustrates a display system.

FIG. 1 illustrates a dynamic display system 100 for displaying data describing observation events observed by one or more data acquisition devices 130 to a user in real time. This data can be represented as a message, for example, an XML (Extensible Markup Language) message. In this specification, these messages will be referred to as events. To display events in real time means to display the events as soon as events are received and processed by the system 100.

The data acquisition devices 130 can include different types of data acquisition devices. For example, the data acquisition devices 130 can include both devices that emit periodic data streams (periodic devices 132) and devices that emit aperiodic data streams (aperiodic devices 134).

A periodic stream is a continuous stream of data occurring at regular time intervals (e.g., one data value every n milliseconds), as opposed to an aperiodic stream, where data is emitted at irregular intervals, for example, only when a tagged item is detected. Examples of a periodic device 132 are sensor devices for measuring one or more physical properties (for example, temperature, humidity, acceleration, pressure, light, position, movement or noise), and servers that provide continuous data feeds (for example, of stock information). An example of an aperiodic device 132 is an RFID (Radio Frequency Identification) tag reader or transponder.

As shown in FIG. 1, the dynamic display system 100 includes a server component (server) 110 and one or more clients 120. In a web-based implementation of the dynamic display system 100, the server 110 is a web application server, the clients 120 are web browsers, or other HTTP (Hypertext Transfer Protocol) based web clients, and the graphical displays on the clients 120 are web pages.

The server 110 is operable to receive events from the data acquisition devices 130 and to publish the events to clients 120 that have subscribed to receive events from the server 110. The clients 120 are operable to visualize the events in a graphical display 140 for viewing by a user.

The graphical display 140 is dynamic, meaning that the display can change—the display is not static. The clients 120 automatically update the graphical display 140 to reflect new events received from the server 110.

The clients 120 can be configured to update the graphical display 140 only when new events have been received from the server 110. The updates do not occur regularly, but only when new events (containing new data to be displayed) have been received.

Clients can subscribe to receive only events pertaining to a certain topic. Clients that subscribe to the same topic will receive the same events and at the same time. For example, workers in a warehouse can each have their own hand-held graphical display 140. Each of these displays 140 can subscribe to the same topic, for example, a topic that provides notice about incoming pallets. When a new pallet arrives at the warehouse, an incoming pallets event is sent to all of the subscribing graphical displays 140 at the same time.

Figure 2:
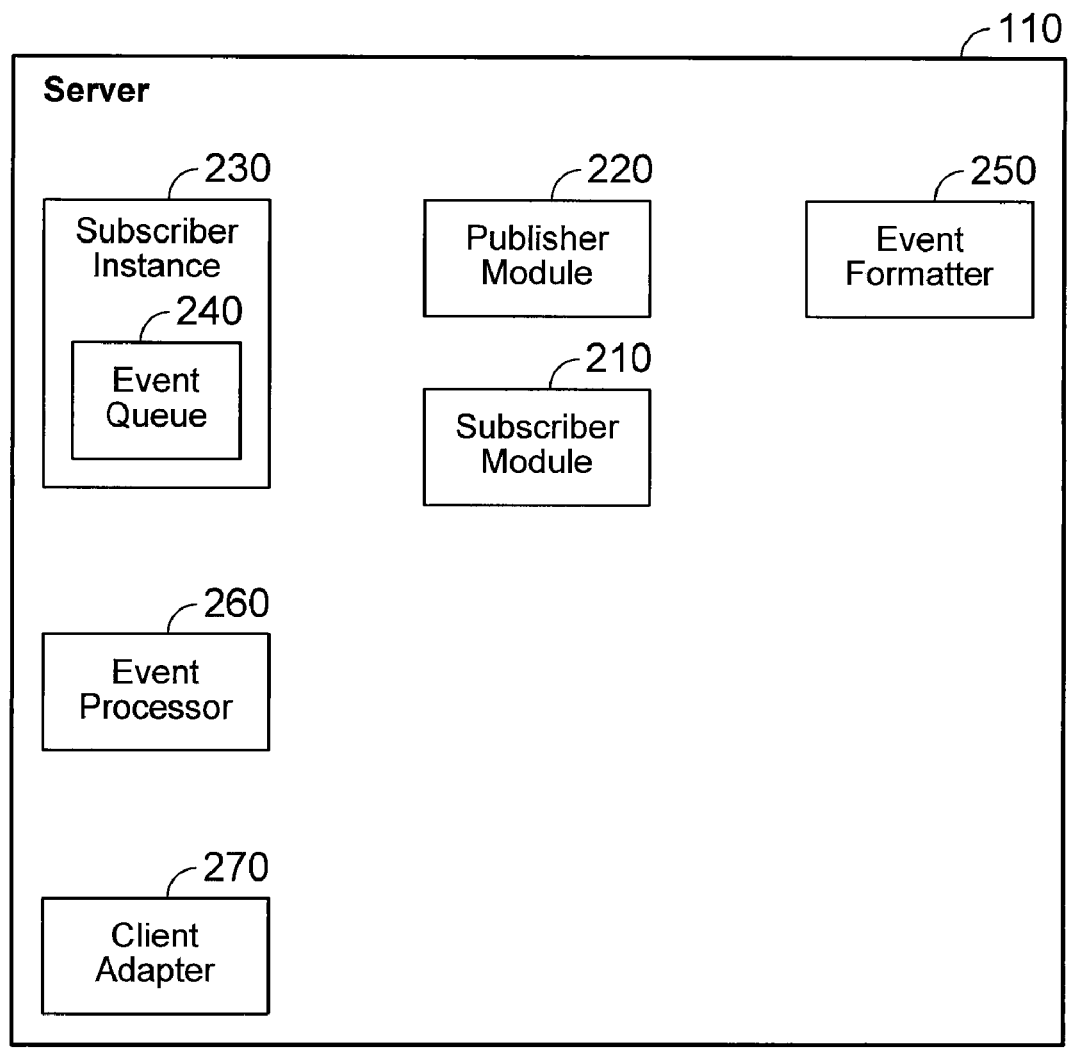
FIG. 2 illustrates a server-side architecture for a display system.

As shown in FIG. 2, in one implementation, the server 110 includes a subscription module 210 for processing subscriptions from the clients 120, a publisher module 220 for publishing events to subscribed clients 120, and one or more subscriber instances 230. The subscriber instances 230 represent the subscribed clients 120. Each subscriber instance 230 includes an event queue 240 for storing events that have been matched to the particular client represented by the subscriber instance 230.

The server 110 can also include an event formatter 250 for formatting events received from the data acquisition devices 130 before the events are delivered to the publisher module 220. For example, the events received from the data acquisition devices 130 may be represented in a device-specific format that is different from the format used by the dynamic display system 100. The event formatter 250 can convert the events from the device-specific format to the system format. The event formatter 250 can include different types of event formatters, each specific to a different type of data acquisition device.

The server 110 can also include a client adapter 270 for handling the data communication between the server 110 and the clients 120. The client adapter 270 can include a plurality of different types of adapters for use with different types of clients that may require different communication protocols or formats. The client adapter 270 can include a browser adapter for web browser clients and a mobile adapter for mobile clients, for example.

The server 110 can also include an event processor 260 for processing the events before the events are delivered to the client adapter 270. Examples of processing tasks include adding time-stamps, adding server-specific headers, and applying style sheets or formatting to the events.

Figure 3:
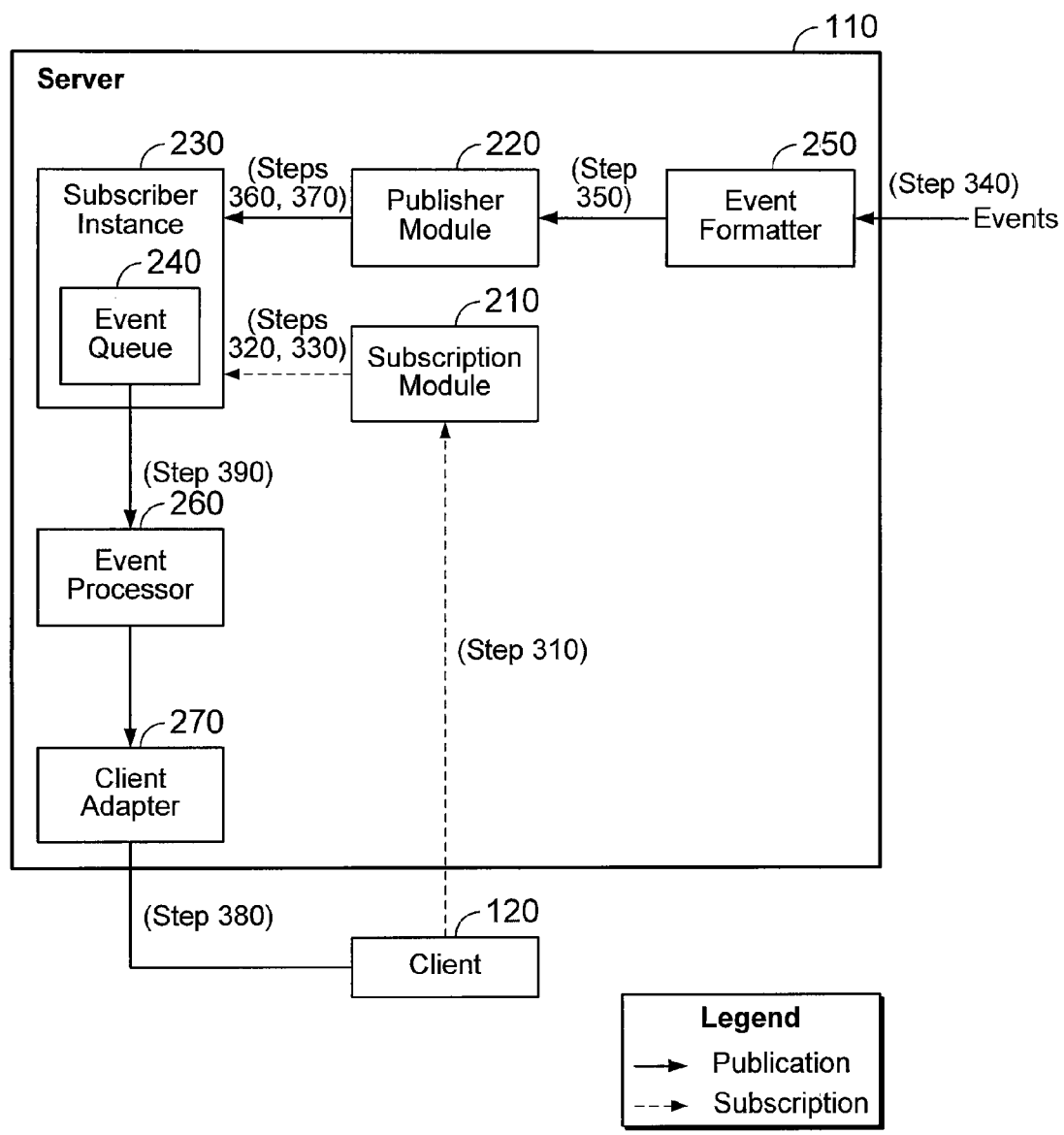
FIG. 3 illustrates a server-side process for a display system.

As shown in FIG. 3, during system operation, a client 120 subscribes to receive events from the server 110 (step 310). The client 120 subscribes to the server 110 by invoking the subscription module 210 and passing to the subscription module 210 one or more parameters specifying the topics that the client 120 is subscribing to.

The subscription module 210 creates a subscriber instance 230 for the client and adds the subscriber instance 230 to a subscriber list for the publisher module 220 (step 320). The subscription module 210 then activates the subscriber instance 230 (step 330), causing the subscriber instance 230 to continuously check for and retrieve events from its event queue 240.

Meanwhile, the server 110 receives events generated by the data acquisition devices 130 (step 340). The events can be preprocessed by the event formatter 250. The event formatter 250 converts the events from a device-specific format to a system-specific format and then forwards the events to the publisher module 220 (step 350).

Upon receiving the events, the publisher module 220 determines the topic of each event and identifies the subscribers (subscriber instances 230) that are interested in the event (step 360). The event is then added to the event queue 240 of each identified subscriber instance 230 (step 370).

The subscriber instance 230 detects the event in its event queue 240, removes the event from the queue and sends the event to the client 120 (step 380). The event can be sent to the client through the client adapter 270.

Optionally, before sending the event to the client adapter 270, the event can be processed by the event processor 260 (step 390).

Figure 4:
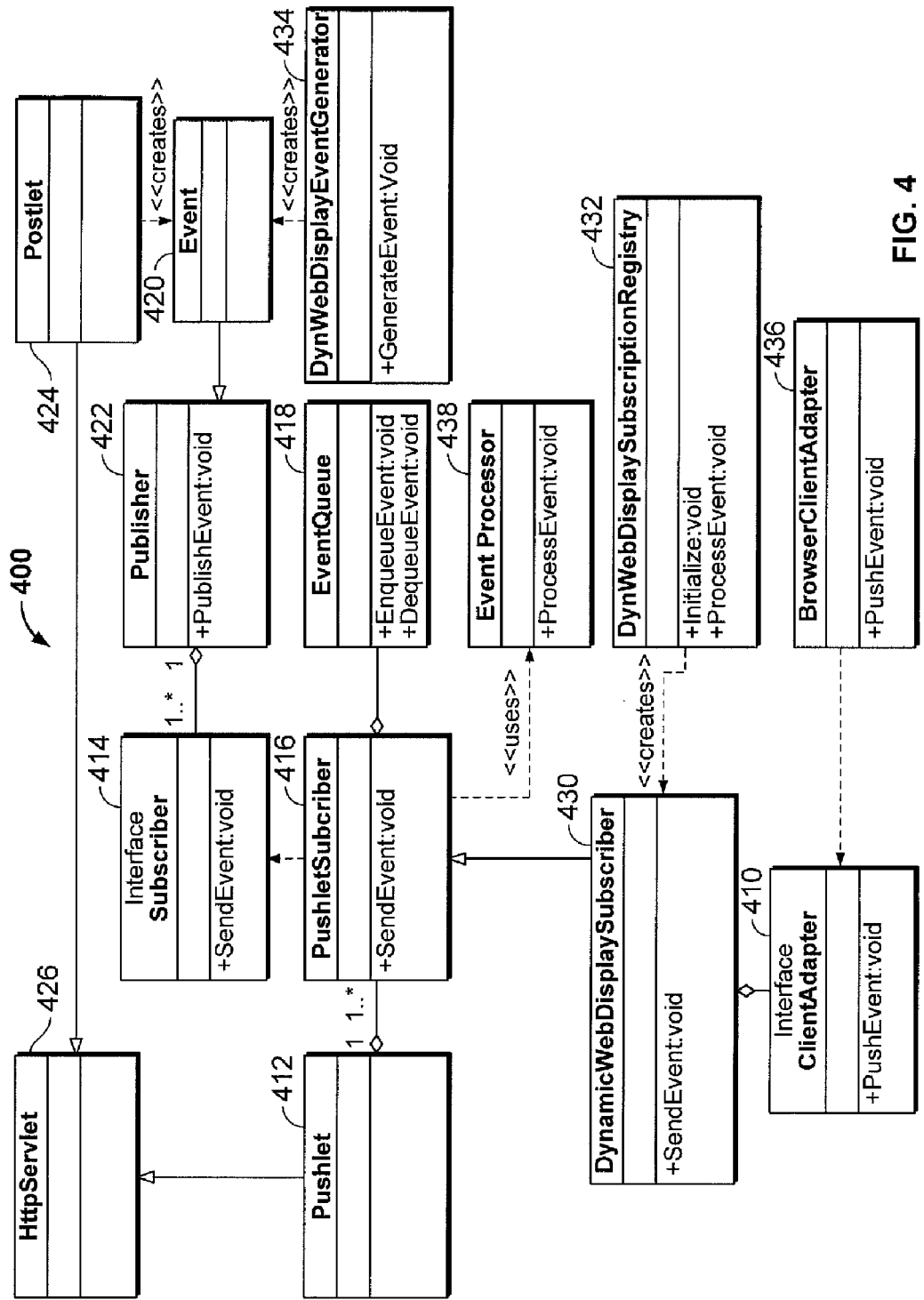
FIG. 4 illustrates a class diagram of classes implementing a server-side architecture for a display system.

A web-based implementation of the above described functionality can be developed by extending a conventional servlet-based technology known as "pushlets". Pushlets is a well-known technique for pushing data directly from a server to a client without requiring the client to load any additional programs or components (e.g., applets or plug-ins). The class diagram 400 shown in FIG. 4 illustrates how the conventional pushlet classes can be extended to provide the above-described functionality.

The conventional pushlet classes are the ClientAdapter class 410, the Pushlet class 412, the Subscriber class 414, the PushletSubscriber class 416, the EventQueue class 418, the Event class 420, the Publisher class 422, the Postlet class 424, and the HttpServlet class 426.

The extension classes are the DynamicWebDisplaySubscriber class 430, the DynWebDisplaySubscriptionRegistry class 432, the DynWebDisplayEventGenerator class 434, and the BrowserClientAdapter class 436.

The DynamicWebDisplaySubscriber class 430 extends the conventional pushlet technology with the capability of subscribing to multiple topics.

The DynWebDisplaySubscriptionRegistry class 432 implements the functionality of the subscriber module 210, that is, the functionality to accept subscriptions, create subscriber instances, and activate the subscriber instances to listen for published events.

The DynWebDisplayEventGenerator class 434 implements the functionality of the event formatter 250, that is, the functionality to convert events from a device-specific format to a system-specific format.

The BrowserClientAdapter class 436 implements the functionality of the client adapter 270, that is, the functionality to work with different types of clients that use different communication protocols and formats.

The Event Processor class 438 implements the functionality of the event processor 260, that is, the functionality to process the events before the events are sent to the client adapter 270.

The previous paragraphs described a technique that allows the graphical display of a client to be updated only when new data is received. The following paragraphs describe a technique that allows the updating of the graphical display to be performed without requiring the entire graphical display to be redrawn.

Selective Redraw of the Graphical Display

In conventional web-based systems, the web server and the web browser communicate using a request-response type of protocol, typically HTTP (Hypertext Transfer Protocol). With HTTP, the web browser makes a request to the web server for a web page and the server responds by serving the web page, which is then displayed by the web browser for viewing by a user. The user can click on links in the web page to navigate to a new web page. To obtain the new web page, the web browser makes a request to the web server for the new web page.

HTTP is a stateless protocol, meaning that each time the web browser (client) requests a new web page, a connection is made to the server, a new page is generated by the server and returned to the client (web browser), and then the connection is destroyed. This new web page is rendered and displayed by the web browser. Even if portions of the existing web page also appear on the new web page, these identical portions are typically still destroyed and then redrawn again. Thus, traditionally, a web page can be updated only by redrawing the entire web page.

Figure 5:
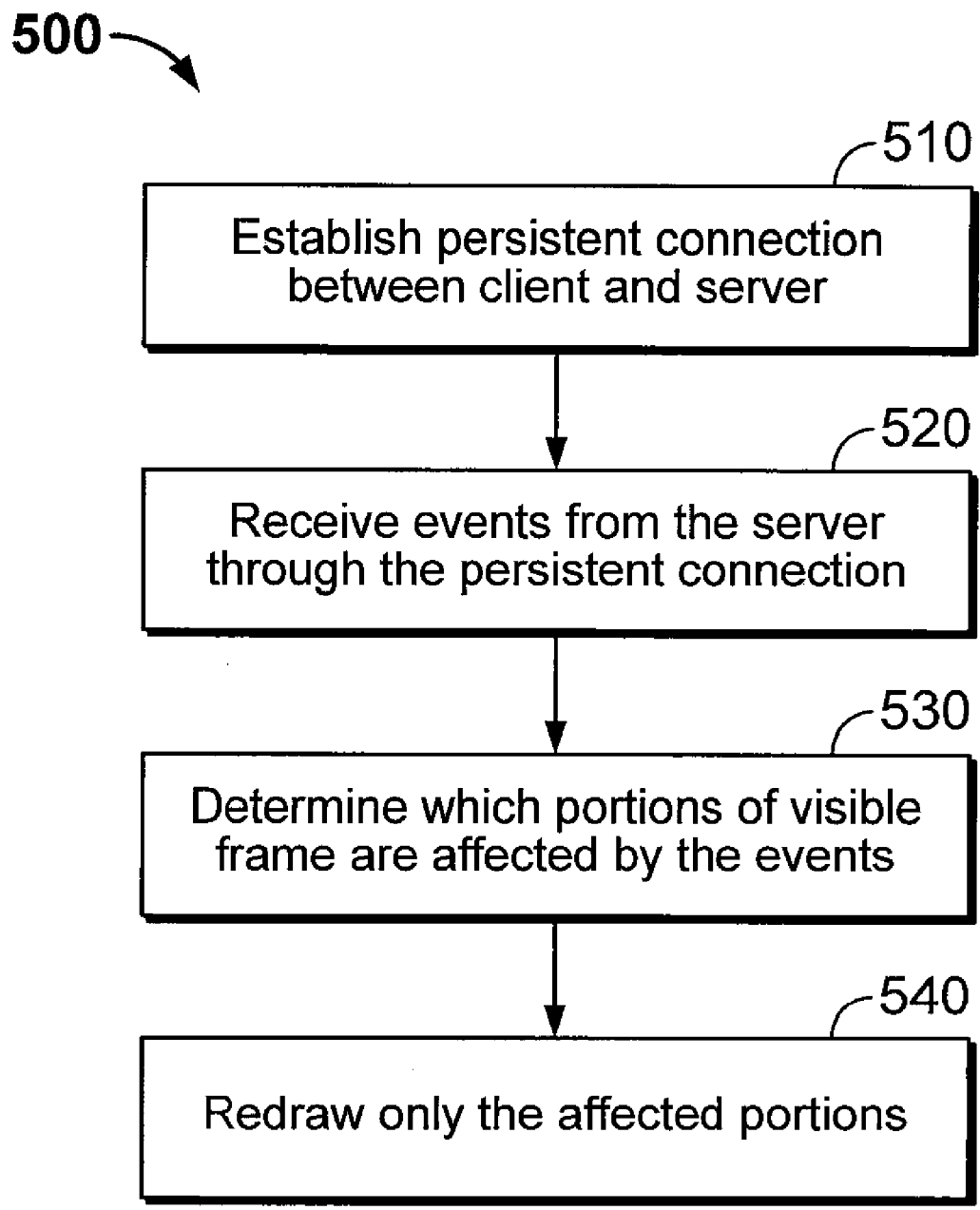
FIGS. 5 and 6 illustrates a client-side process for a display system.

As will be described below, in one implementation of the dynamic display system 100, the client 120 uses a technique that allows a web-based graphical display (web page) on the client 120 to be updated without redrawing the entire web page. In a process 500, illustrated in FIG. 5, a technique for selectively redrawing portions of the web page involves first establishing a persistent connection between the client 120 and the server 110 (step 510). Once the persistent connection has been established, the server 110 can send events to the client 120 through the persistent connection (step 520). Subsequent events can also be sent through the same persistent connection.

Figure 6:
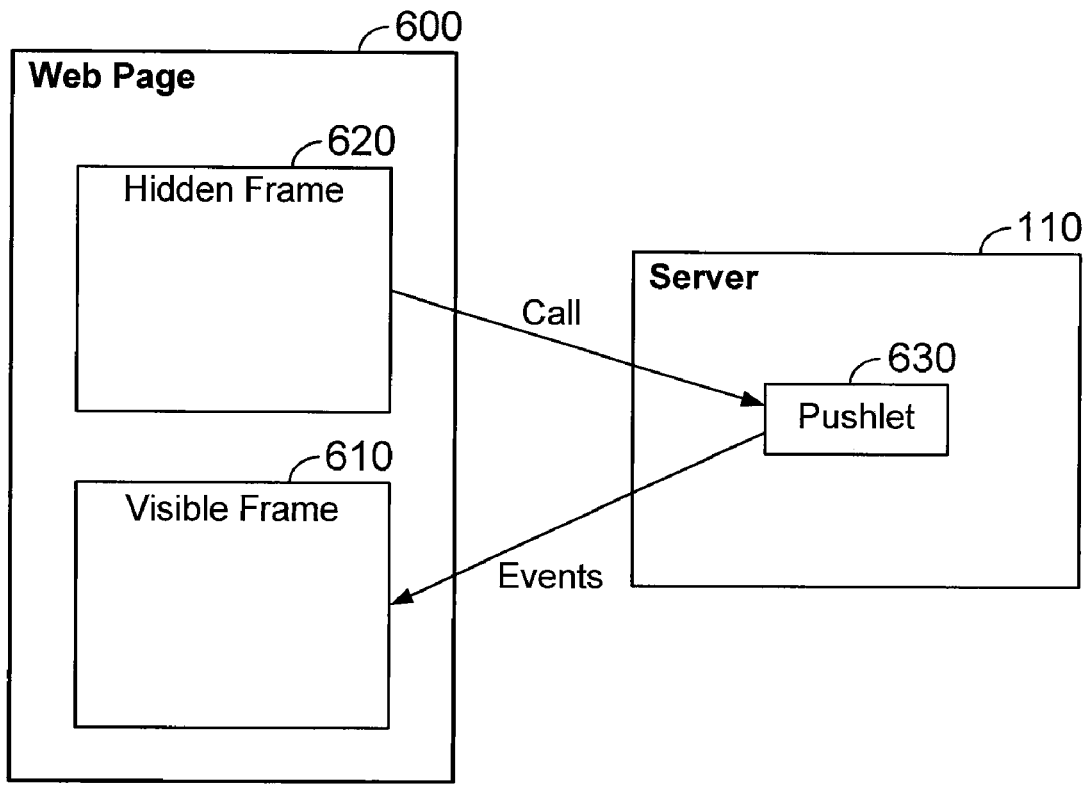

The persistent connection can be established when the client 120 subscribes to the server 110 (step 310 of FIG. 3). The client makes a subscription request to the server 110. In response to the subscription request, the server 110 returns a web page 600, illustrated in FIG. 6, that includes two frames, a visible frame 610 and a hidden frame 620. The hidden frame 620 calls a pushlet 630 running on the server 110. The pushlet 630 pushes events to the client 120 which then displays the events (or to be precise, the data contained in the event) in the visible frame 610.

Upon receiving the events, the client 120 determines which portions of the visible frame 610 are affected by the events (step 530) and only redraws the affected portions of the frame 610 (step 540). Portions not affected by the events are not redrawn. The client performs the selective redraw by manipulating elements of a document object model (DOM) for the web page 600. The DOM is a hierarchical representation of the elements of the web page 600. The DOM elements can be manipulated using client-side scripting code (for example, JavaScript or VisualBasicScript).

End-To-End System

Figure 7A:
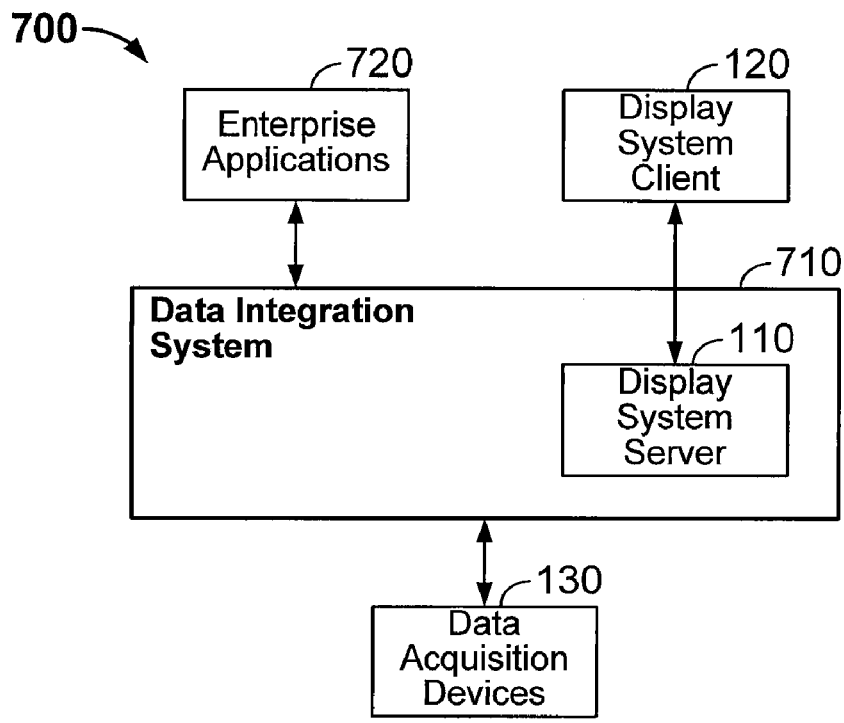
FIGS. 7A and 7B illustrate a display system combined with a data integration system.

As shown in FIG. 7A, the above-described dynamic display system 100 (specifically, components 110 and 120) can be combined with a data integration system 710 to provide an end-to-end system 700 for automatically acquiring sensor and RFID data, processing the acquired data, and making the processed data available to enterprise applications 720 and/or displaying the processed data to a user.

Figure 7B:
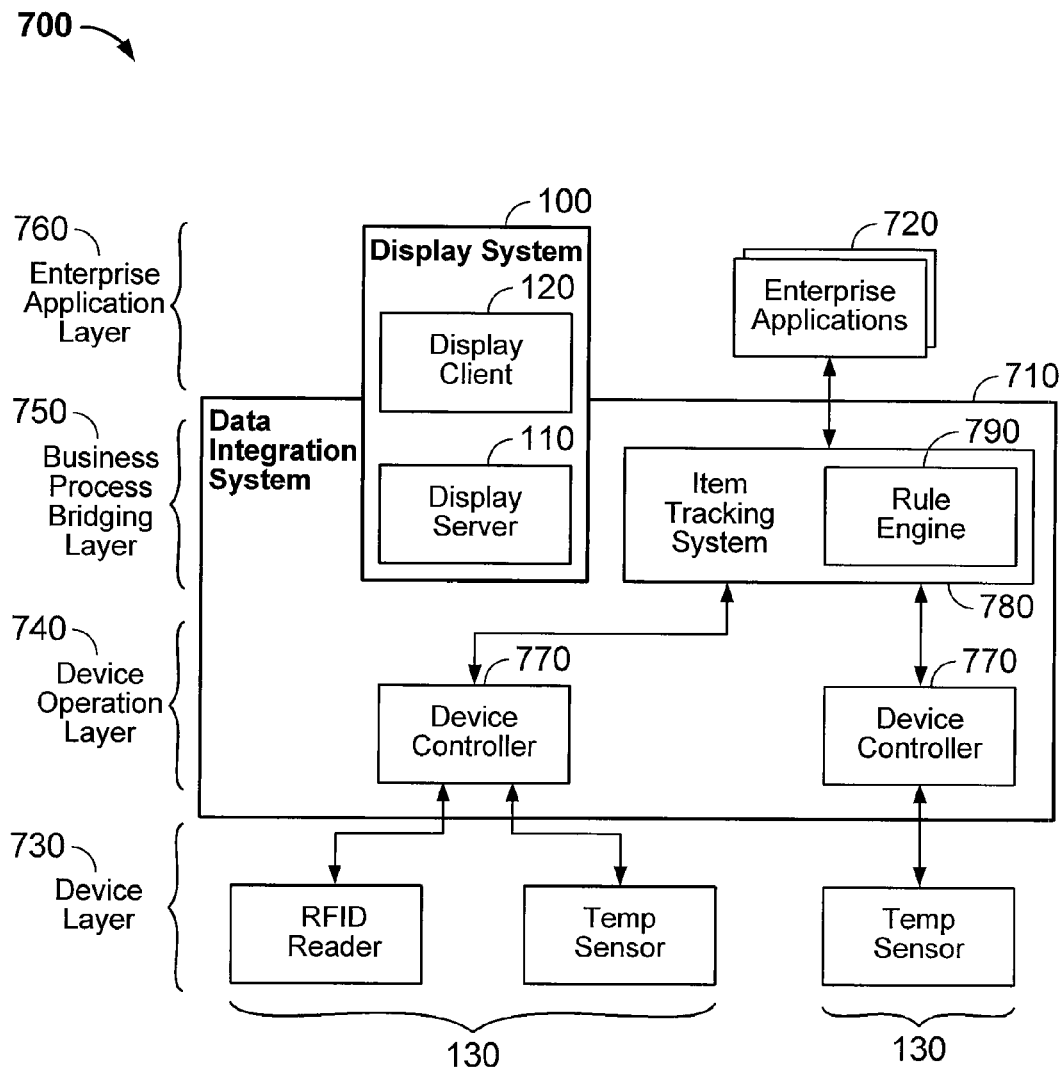

As shown in FIG. 7B, the end-to-end system 700 can be represented conceptually as four layers: a device layer 730, a device operation layer 740, a business process bridging layer 750, and an enterprise application layer 760.

The bottom layer, the device layer 730, represents the data acquisition devices 130. The topmost layer, the enterprise application layer 760, represents the enterprise applications 720. The two middle layers, device operation layer 740 and business process bridging layer 750, represent the data integration system 710.

The device layer 730 includes different types of data acquisition devices 130, for example, RFID tag readers, environmental sensors, and PLC (Programmable Logic Control) devices, which are devices commonly used in factory automation. The device layer 730 also includes a hardware-independent, low-level interface for reading and writing data from and to the different types of data acquisition devices 130. The device layer 730 reads data from the data acquisition devices 130 and reports the data to the next layer, the device operation layer 740.

The device operation layer 740 includes one or more device controllers 770. Each device controller 770 is responsible for coordinating one or more of the data acquisition devices 130. Each device controller 770 receives data from a data acquisition device 130 through the device layer 730 and forwards the data to the next layer, the business process bridging layer 750. Before forwarding the data, the device controller 770 can process the data, for example, using a chain of data processors. Device controllers and data processing chains will be described in more detail below and are also described in U.S. patent application Ser. No. 10/854,766, entitled "Generic Software Mechanism for the Control of RFID Readers and other Devices".

The business process bridging layer 750 associates incoming data with business processes performed by the enterprise applications 720. In one implementation, these business processes involve the storage and transport of physical items, for example, goods in a supply chain. The business process bridging layer 750 includes a database system that records the status and history of these physical items. The database records can include information about the item's location, environment, and relationship to other items. This database system and the corresponding tracking functionality will be referred to as an item tracking system 780.

The enterprise application layer 760 supports business processes of enterprise applications 750 such as Supply Chain Management (SCM), Customer Relationship Management (CRM), Asset Management, or First Responder Support. The enterprise application layer 760 receives events generated by the underlying business process bridging layer 750.

As shown in FIG. 7B, the above-described dynamic display system 100 can span the business process bridging layer 750 and enterprise application layer 760. The server component 110 of the display system 100 is application-independent. It can be implemented as part of the business process bridging layer 750. The clients 120 are application-specific and can be implemented as part of the enterprise application layer 760.

The dynamic display system 100 can serve as a front-end to the item tracking system 780. The item tracking system 780 can generate events to send to the enterprise applications 720. These events can also be sent to the dynamic display system 100.

In one implementation, the item tracking system 780 is distributed across multiple locations, which will be referred to as nodes. Each node of the item tracking system 780 is responsible for integrating incoming data from the device controllers 770 with the business processes of the enterprise applications 720. Each node is operable to interact bi-directionally with the device controllers 770, for example, to receive events from the device controllers 770 and to send commands to the device controllers 770. Each node is also operable to interact bi-directionally to with the enterprise applications 720, for example, to receive business data from the enterprise application 720 and to send a response). These interactions are treated as either incoming or outgoing messages.

Incoming messages to the item tracking system 780 are routed to a rule engine 790, which, based on the message type, evaluates a specified list of conditions. The result of the evaluation step is a set of qualifying rules for which one or more activities are executed in a specified order. Such an activity can, for example, update the system status of an object in the item tracking system 780, communicate with an enterprise application 720, or generate and write data to a tag.

The item tracking system 780 provides a data repository for storing information about the current status and history of the objects being processed. This information includes data about the operations that have been applied to an object (e.g, move, pack, or unpack operations), its movement and current location, and its structure (e.g, packing information). Also, the repository replicates business data from the enterprise applications 720 about products and business partners, or the physical location and type of the RFID readers. The repository provides the basis for the execution of business logic in the item tracking system 780 in the form of customizable rules. This allows the pre-processing of incoming observation data and the handling of abnormal situations within the item tracking system 780, such as discrepancies between a received advanced shipping notification (ASN) and a detected pallet.

Figure 8:
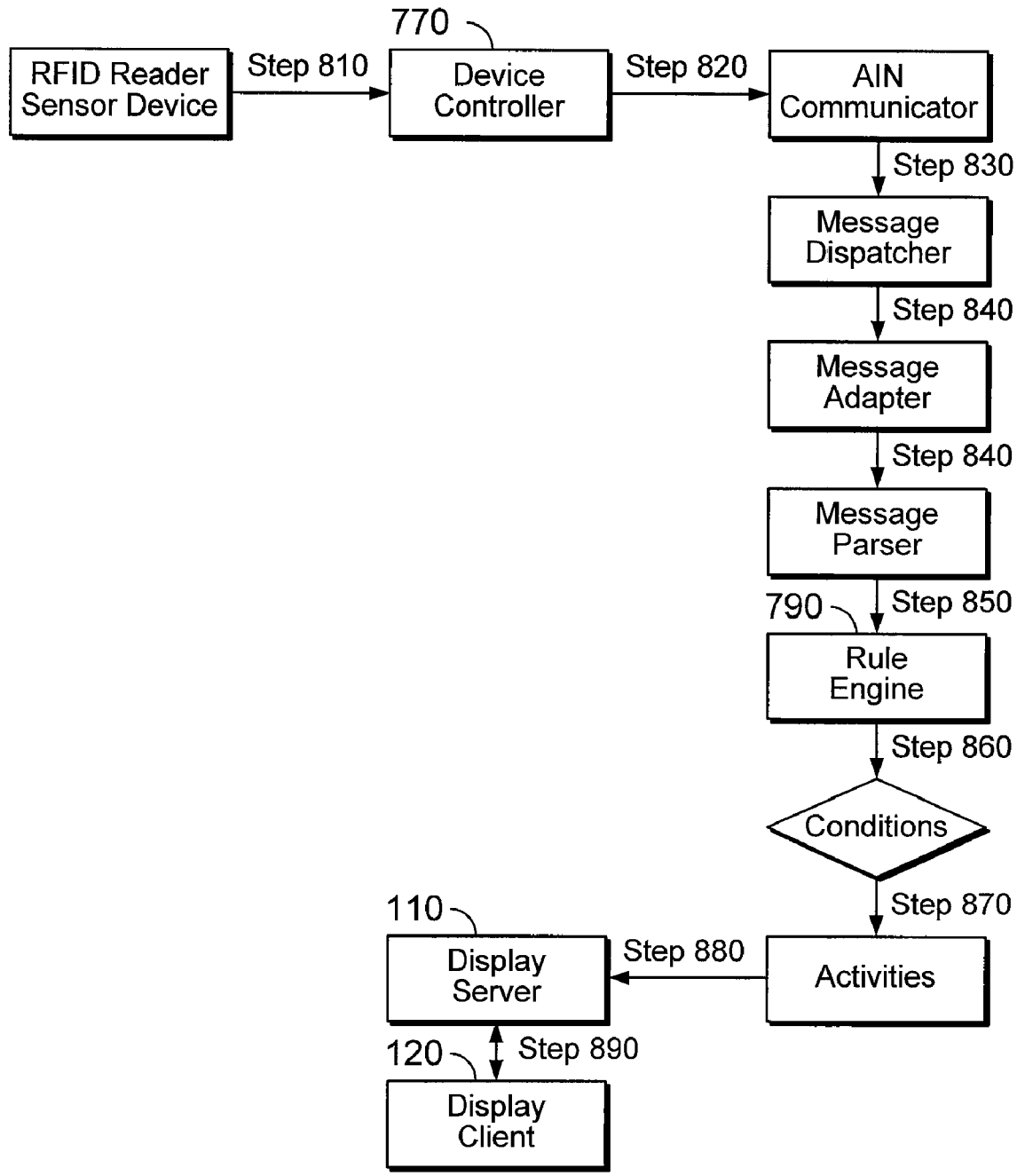
FIG. 8 illustrates data flow within the combined system.

As shown in FIG. 8, during operation of the end-to-end system 700, RFID tag or sensor data is sent from an RFID reader or sensor device to a device controller 770 (step 810). The device controller 770 pre-processes (e.g., filters, aggregates, enhances) the incoming data and sends a corresponding observation message to a communication layer (communicator) of the item tracking system 780 (step 820).

Once the message is received, the communicator then determines the message type and sends the message to a message dispatcher within the item tracking system 780 (step 830). The message dispatcher selects an appropriate message adapter and sends the message through the message adapter to a message parser within the item tracking system 780 (step 840). The message parser parses the message and generates a message object that is sent to the rule engine 790 of the item tracking system 780 (step 850).

The rule engine 790 analyzes a set of conditions (step 860) and determines a set of activities to be executed (step 870). An example of an activity is to prepare and immediately send the incoming RFID or sensor data to the display system 100. Such an activity will be referred to as a display activity. An example Java class implementing a display activity is shown in Table 1 below. The execution of a display activity by the rule engine 790 initiates the sending of an event to the server 110 of the display system 100 (step 880). The event is received by the server 110 and processed according to the data flow described above with respect to FIG. 3.

Ultimately, the event is sent to the client 120 (step 890), which performs the dynamic update of the affected parts of the graphical display 140, as described above with respect to FIG. 5.

TABLE 1

```
import ...
public class SimpleActivityBean implements SessionBean, IActivity {
    public IActivityStatus execute(    IBasicMessage aMessage,
                                       IActivityContext aContext,
                                       IActivityParameter[ ] aParameterArray,
                                       IServiceLocator aServiceLocator)
    throws ActivityException {
        EventMessage eventMessage = (EventMessage) aMessage;
        ArrayList tagList = eventMessage.getEpcList( );
        String readerID = eventMessage.getReaderId( );
        Timestamp ts = eventMessage.getTimeStamp( );
        int numofEpc = eventMessage.getEpcList( ).size( );
        StringBufer toSend = new StringBuffer(readerID + "\n" + ts + "\n");
        for( int i = 0 ; i < tagList.size( ); i++ ) {
            aServiceLocator.getILogger( ).logInfo (" EPC " + i + ": " +
                                                  tagList.get(i).toString( ));
            toSend.append ( tagList.get(i).toString( ));
        }
        // Connect to pushlet servlet
        DataOutputStream out = null;
        DataInputStream input = null;
        try {
            URL testURL =
            new URL("http://localhost:50000/cbit/servlet/AutoTableDemoPublisher");
            URLConnection cbitConnection = testURL.openConnection( );
            aServiceLocator.getILogger( ).logInfo("connected to servlet");
            cbitConnection.setDoInput(true);
            cbitConnection.setDoOutput(true);
            cbitConnection.setUseCaches(false);
            cbitConnection.setRequestProperty("Content-Type",
                                              "application/x-www-form-urlencoded");
            out = new DataOutputStream(cbitConnection.getOutputStream( ));
            out.writeBytes (toSend);
            out.flush ( );
            out.close ( );
            input = new DataInputStream (cbitConnection.getInputStream ( ));
        }
        catch (Exception e) {
            ...
        }
        return new ActivityStatus(ActivityStatus.STATUS_OK);
    }
    public void ejbRemove( ) { }
    public void ejbActivate( ) { }
    public void ejbPassivate( ) { }
    public void setSessionContext(SessionContext context) {
        myContext = context;
    }
    private SessionContext myContext;
    /** Create Method. */
    public void ejbCreate( ) throws CreateException {
        // TODO : Implement
    }
}
```

The various implementations of the invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component (e.g., a data server), a middleware component (e.g., an application server), or a front-end component (e.g., a client computer having a graphical user interface or a Web browser through which a user can interact with an implementation of the invention), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular implementations, but other implementations are within the scope of the following claims. For example, the operations of the invention can be performed in a different order and still achieve desirable results. In certain implementations, multitasking and parallel processing may be preferable.

What is claimed is:

1. A computer program product, tangibly embodied in an information carrier, the computer program product being operable to cause data processing apparatus to perform operations comprising:
   receiving a subscription request and a subscription topic at a subscriber module of a server from a client;
   returning a web-based graphical display to the client in response to receiving the subscription request, the web-based graphical display comprising a hidden frame and a visible frame;
   creating a subscriber instance for the client using the subscriber module, the subscriber instance including an event queue;
   adding the subscriber instance to a subscriber list for a publisher module of the server;
   activating the subscriber instance, thereby causing the subscriber instance to check for and retrieve events from the event queue;
   receiving an event from a data acquisition device;
   formatting the event using an event formatter;
   determining whether a topic of the event is the subscription topic, at the publisher module;
   adding the event to the event queue, if the topic of the event is determined to be the subscription topic;
   detecting the event in the event queue; and
   transmitting the event to the client using the subscriber instance for updating a portion of the visible frame that is affected by the event.

2. A computer program product, tangibly embodied in an information carrier, the computer program product being operable to cause data processing apparatus to perform operations comprising:
   receiving a subscription request and a subscription topic at a server from a client;
   returning a web-based graphical display to the client in response to receiving the subscription request, the web-based graphical display comprising a hidden frame and a visible frame;
   creating a subscriber instance for the client, the subscriber instance including an event queue;
   receiving an event from a data acquisition device;
   determining whether a topic of the event is the subscription topic;
   adding the event to the event queue, if the topic of the event is determined to be the subscription topic; and
   transmitting the event to the client using the subscriber instance for updating a portion of the visible frame that is affected by the event.

3. The computer program product of claim 2,
   wherein the subscription topic is received at a subscriber module of the server, and
   wherein the subscriber instance is created using the subscriber module.

4. The computer program product of claim 2, further comprising adding the subscriber instance to a subscriber list for a publisher module of the server.

5. The computer program product of claim 2, further comprising activating the subscriber instance, thereby causing the subscriber instance to check for and retrieve events from the event queue.

6. The computer program product of claim 2, wherein it is determined whether the topic of the received event is the subscription topic at a publisher module of the server.

7. The computer program product of claim 2, further comprising formatting the event using an event formatter.

8. The computer program product of claim 7, wherein the event formatter is implemented as a DynWebDisplayEventGenerator pushlet class.

9. The computer program product of claim 2, wherein formatting the received event further comprises converting the event from a device-specific format to a system-specific format.

10. The computer program product of claim 2, further comprising removing the event from the event queue.

11. The computer program product of claim 2, further comprising detecting the event in the event queue.

12. The computer program product of claim 2, wherein the event is transmitted to the client via a client adapter.

13. The computer program product of claim 12, wherein the client adapter is implemented as a BrowserClientAdapter pushlet class.

14. The computer program product of claim 2, wherein the subscriber module is implemented as a DynWebDisplaySubscriber pushlet class.

15. The computer program product of claim 2, further comprising establishing a persistent connection between the server and the client.

16. The computer program product of claim 2, further comprising transmitting a web page from the server to the client, based on receiving the subscription topic.

17. The computer program product of claim 16, wherein the transmitted event effectuates the selective redrawing of a portion of the web page.

18. The computer program product of claim 2, further comprising receiving a call from the client, wherein the event is transmitted to the client based on receiving the call.

19. The computer program product of claim 2, further comprising invoking a subscriber module of the server based on receiving the subscription topic.

20. The computer program product of claim 2, wherein the subscriber instance is created using the invoked subscriber module.

21. The computer program product of claim 2, wherein the event is an Extensible Markup Language (XML) message.

22. A computer-implemented method comprising:
   receiving a subscription request and a subscription topic at a server from a client;
   returning a web-based graphical display to the client in response to receiving the subscription request, the web-based graphical display comprising a hidden frame and a visible frame;
   creating a subscriber instance for the client, the subscriber instance including an event queue;
   receiving an event from a data acquisition device;
   determining whether a topic of the event is the subscription topic;
   adding the event to the event queue, if the topic of the event is determined to be the subscription topic; and
   transmitting the event to the client using the subscriber instance for updating a portion of the visible frame that is affected by the event.

23. A device comprising:
   a subscriber module configured to:
      receive a subscription request and a subscription topic from a client,
      return a web-based graphical display to the client in response to receiving the subscription request, the web-based graphical display comprising a hidden frame and a visible frame, and
      create a subscriber instance including an event queue for the client; and
   a publisher module configured to:
      determine whether a topic of a received event is the subscription topic,
      add the event to the event queue if the topic of the event is determined to be the subscription topic, and
      transmit the event to the client using the subscriber instance for updating a portion of the visible frame that is affected by the event.

24. The device of claim 23, further comprising an event formatter configured to convert the received event from a device-specific format to a system format.

25. The device of claim 23, further comprising an event processor configured to add a time-stamp, add a server-specific header, or apply a style sheet or formatting to the received event.

26. The device of claim 23, further comprising a client adapter including a browser adapter for web browser clients or a mobile adapter for mobile clients.

* * * * *